US012066903B2

(12) United States Patent
Pederson

(10) Patent No.: US 12,066,903 B2
(45) Date of Patent: Aug. 20, 2024

(54) TRANSACTION RECOVERY FROM A FAILURE ASSOCIATED WITH A DATABASE SERVER

(71) Applicant: TERADATA US, INC., San Diego, CA (US)

(72) Inventor: Donald Raymond Pederson, San Diego, CA (US)

(73) Assignee: Teradata US, Inc., San Diego, CA (US)

( * ) Notice: Subject to any disclaimer, the term of this patent is extended or adjusted under 35 U.S.C. 154(b) by 0 days.

(21) Appl. No.: 16/720,386

(22) Filed: Dec. 19, 2019

(65) Prior Publication Data

US 2021/0034477 A1    Feb. 4, 2021

Related U.S. Application Data

(60) Provisional application No. 62/881,779, filed on Aug. 1, 2019.

(51) Int. Cl.
*G06F 11/14*    (2006.01)
*G06F 16/2455*    (2019.01)

(52) U.S. Cl.
CPC ...... *G06F 11/1474* (2013.01); *G06F 11/1469* (2013.01); *G06F 11/1471* (2013.01);
(Continued)

(58) Field of Classification Search
CPC ............. G06F 11/1474; G06F 11/1469; G06F 11/1471; G06F 2201/82; G06F 2201/80;
(Continued)

(56) References Cited

U.S. PATENT DOCUMENTS 5,734,896 A  *  3/1998  Rizvi ................. G06F 16/2365
                                                714/E11.131
7,865,471 B1 *  1/2011  Stagg ................. G06F 11/1471
                                                707/661
(Continued)

OTHER PUBLICATIONS

Krishnamurthy, Sandhya, Choosing the right fit—Immediate or Eventual Persistence?, Jul. 22, 2016, Couchbase, <https://www.couchbase.com/blog/immediate-or-eventual-persistence/> (Year: 2016).*
(Continued)

*Primary Examiner* — Yolanda L Wilson
(74) *Attorney, Agent, or Firm* — Randy L. Campbell, Jr.

(57) ABSTRACT

In some examples, a system sends a transaction to a database server to cause storing of data of the transaction in a cache of the database server, where the data in the cache is for inclusion in a backup of data from the database server to a remote data store (e.g., the backup may be in a cloud and may be a snapshot). The system detects a failure associated with the database server, and in response to detecting the failure, requests, from the database server or a replacement database server, transaction information of at least one transaction that was successfully applied to the remote data store, the transaction information based on the backup of data. The system causes replay one or more transactions to recover data at the database server or the replacement database server, to perform recovery of the database server or the replacement database server to a current state.

18 Claims, 7 Drawing Sheets

(52) U.S. Cl.
CPC .... *G06F 16/24552* (2019.01); *G06F 2201/80* (2013.01); *G06F 2201/82* (2013.01)

(58) Field of Classification Search
CPC ............ G06F 11/1464; G06F 16/2358; G06F 16/2365; G06F 16/2379; G06F 16/27; G06F 16/273

See application file for complete search history.

(56) References Cited

U.S. PATENT DOCUMENTS

| | | | | |
|---|---|---|---|---|
| 8,874,508 | B1* | 10/2014 | Mittal | G06F 11/2048 707/610 |
| 9,047,355 | B2 | 6/2015 | Ferguson et al. | |
| 9,612,921 | B2 | 4/2017 | Ferguson | |
| 9,805,121 | B2 | 10/2017 | Brown et al. | |
| 2006/0218205 | A1* | 9/2006 | Shimizu | G06F 11/1471 |
| 2013/0151895 | A1* | 6/2013 | Lee | G06F 11/2097 714/19 |
| 2014/0250326 | A1* | 9/2014 | Ferguson | G06F 11/1471 714/20 |
| 2015/0378840 | A1* | 12/2015 | Shang | G06F 11/1658 714/20 |
| 2016/0147614 | A1* | 5/2016 | Mittal | G06F 11/1446 707/615 |
| 2016/0380913 | A1* | 12/2016 | Morgan | H04L 41/0654 709/226 |
| 2018/0143881 | A1* | 5/2018 | Singer | G06F 11/1658 |
| 2018/0246788 | A1* | 8/2018 | Hatasaki | G06F 11/1451 |
| 2019/0108365 | A1* | 4/2019 | Lyakas | H04L 9/0894 |
| 2019/0235974 | A1* | 8/2019 | Pardon | G06F 11/2094 |
| 2019/0332692 | A1* | 10/2019 | Rachapudi | G06F 11/1471 |
| 2019/0377821 | A1* | 12/2019 | Pleshachkov | G06F 16/273 |

OTHER PUBLICATIONS

Wikipedia, Amazon S3 last edited Nov. 26, 2019 (8 pages).
Teradata, Teradata Unity, Data Warehousing, Simplify and Integrate Your Analytical Ecosystem, 2016 (3 pages).
Wikipedia, Google Storage last edited Nov. 2, 2019 (2 pages).
Wikipedia, Microsoft Azure last edited Nov. 22, 2019 (8 pages).

* cited by examiner

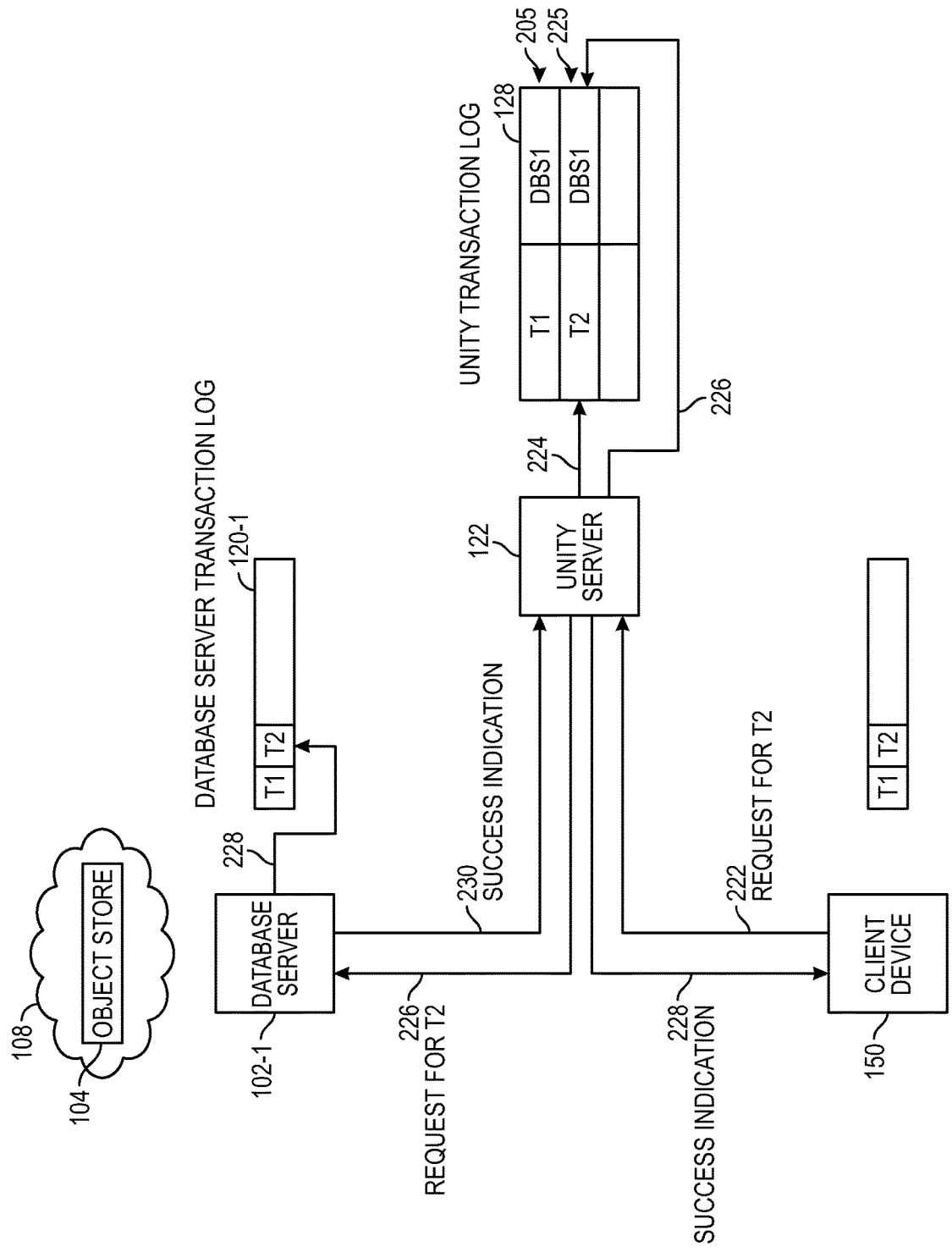

TRANSACTION RECOVERY FROM A FAILURE ASSOCIATED WITH A DATABASE SERVER

CROSS REFERENCE TO RELATED APPLICATION

This application claims the benefit of U.S. Provisional Application No. 62/881,779, filed Aug. 1, 2019, which is hereby incorporated by reference in its entirety.

BACKGROUND

A relational database management system (DBMS) stores databases that include collections of logically related data arranged in a predetermined format, such as in tables that contain rows and columns. To access the content of a table in a database, queries according to a standard database query language (such as the Structured Query Language or SQL) are submitted to the database. A query can also be issued to insert new entries into a table of a database (such as to insert a row into the table), modify the content of the table, or to delete entries from the table. Examples of SQL statements include INSERT, SELECT, UPDATE, and DELETE.

In other examples, object stores can be used to store objects that are usually larger in size than rows of a table in a relational DBMS. The object stores can be provided in a cloud that is accessible over a network, for example.

BRIEF DESCRIPTION OF THE DRAWINGS

Some implementations of the present disclosure are described with respect to the following figures.

FIGS. 2A-2D illustrate an example of performing a snapshot-based recovery procedure, according to some implementations of the present disclosure.

Figure 1:
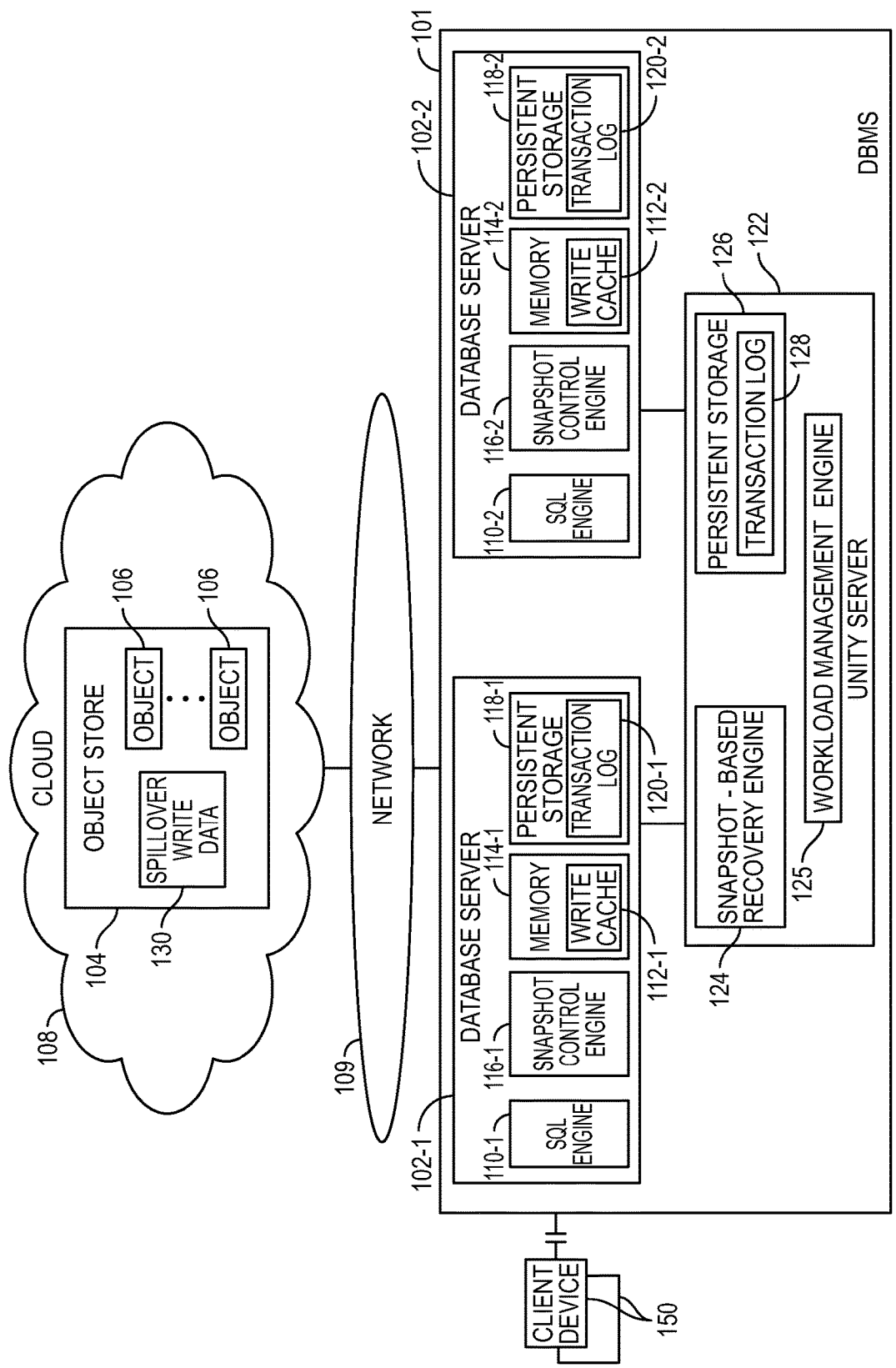
FIG. 1 is a block diagram of an example arrangement that includes a unity server, database servers, and a remote object store according to some implementations of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, as shown in FIG. 1, a database management system (DBMS) 101 includes multiple relational DBMS servers 102-1 and 102-2. Although two DBMS servers 102-1 and 102-2 are shown in FIG. 1, it is noted that in other examples, just one DBMS server or more than two DBMS servers can be provided in the DBMS 101.

Each relational DBMS server 102 (either 102-1 or 102-2) (also referred to as a "database server") can be used with a remote object store 104 that stores objects 106. A "database server" or "DBMS server" can be implemented using one or more computer nodes, where a "computer node" can refer to an entire computer, a portion of a computer, a processor, a portion of a processor, and so forth.

The object store 104 can be accessible in a cloud 108. A "cloud" can refer to any infrastructure, including computing, storage, and communication resources, that can be accessed remotely by user devices over a network, such as a network 109 shown in FIG. 1. Alternatively, the object store 104 can be provided in a data center or in any other computing environment.

As used here, an "object" can refer to any separately identifiable or addressable unit of data. More generally, the object store 104 can be referred to as a "data store," which stores data in one or more storage devices.

The network 109 can include a public network (e.g., the Internet), a local area network (LAN), a wide area network (WAN), a wireless network (e.g., a wireless local area network or WLAN, a cellular network, etc.), or any other type of network.

Each database server 102 (102-1 or 102-2) includes a respective SQL engine 110-1 or 110-2 that is able to process SQL queries, including data definition language (DDL) statements and data manipulation language (DML) statements. As used here, an "engine" can refer to a hardware processing circuit, or a combination of a hardware processing circuit and machine-readable instructions executable on the hardware processing circuit. A hardware processing circuit can include any or some combination of a microprocessor, a core of a multi-core microprocessor, a microcontroller, a programmable integrated circuit, a programmable gate array, a digital signal processor, or another hardware processing circuit.

The SQL queries can be sent by one or more client devices 150 that are coupled to the DBMS 101 over an interconnect, such as the network 109 or another link. The SQL queries can be submitted by users at the one or more client devices 150, or by applications or utilities running at the one or more client devices 150. The database servers 102-1 and 102-2 perform transactions in response to the SQL queries.

Traditionally, a database server stores data in relational databases stored in a block-based storage, in which data is stored as blocks that are smaller in size than objects of object stores. For example, a block-based storage can include disk-based storage devices, solid state storage devices, and so forth. The block-based storage can be connected to the database server over a relatively high-speed link, such that the database server can access (read or write) data in a relational database with relatively low input/output (I/O) latency (i.e., the delay between a time that a request is submitted and a time that the request is satisfied at the storage is relatively low). Such block-based storage can be considered the local storage of the database server. A local storage of the database server can be accessed with lower I/O latency than a remote storage.

In some examples, instead of coupling local block-based storage to the database servers 102-1 and 102-2, the remote object store 104 is used as the primary data store by the database servers 102-1 and 102-2. In such implementations, the database servers 102-1 and 102-2 do not store full copies of the data in the remote object store 104 in any local storage (e.g., block-based storage) of the database servers 102-1 and 102-2. The objects 106 of the object store 104 can have variable sizes, and each object can have a size between 10 megabytes (MB) and 100 MB (or even hundreds of gigabytes (GB) or other sizes). In other examples, an object can have a smaller or larger size. An object in an object store is typically larger in size than data records (e.g., rows, tables, etc.) stored in a local block-based storage. Note that the database servers 102-1 and 102-2 can include caches to store a portion of the data for improving efficiency in data access. As noted above, the object store 104 can be provided in the cloud 108 or another remote computing environment.

When responding to a database query, a database server 102 can access (write or read) data of the object store 104. In some examples, accessing data of the object store 104 (which is a remote storage) can have a higher I/O latency than accessing data of the local storage of the database server 102.

The object store 104 can be of any of various different types of object stores. For example, the object store 104 can be according to any of the following: Simple Storage Service (S3) from AMAZON WEB SERVICES (AWS), Google Cloud Storage, Microsoft AZURE, and so forth. In alternative examples, the object store 104 does not have to be in a cloud, but rather can be within a data center or part of any other computing environment.

Objects 106 of the object store 104 can be identified using keys or other identifiers. In addition, the object store 104 can provide an interface, such as an application programming interface (API) or other type of interface, through which requesters can access the objects 106.

For improved performance, each database server 102 can include one or more caches included in a memory 114 (114-1 or 114-2) of the database server 102. In the example of FIG. 1, the memory 114-1 in the database server 102-1 includes a write cache 112-1 to store write data that is to be saved to the object store 104. Similarly, the memory 114-2 in the database server 102-2 includes a write cache 112-2.

Although not shown, each database server 102 can further include a read cache to store read data retrieved from the object store 104.

In some examples, each memory 114 can include a nonvolatile memory, such as implemented using one or more flash memory devices or other types of memory devices. In further examples, each memory 114 can be implemented as a volatile memory, such as including one or more dynamic random access memory (DRAM) devices or static random access memory (SRAM) devices, and so forth.

In response to a SQL query (such as from a client device 150) to write data (e.g., insert, delete, update) received by a database server 102, the respective SQL engine 110 (110-1 or 110-2) can store the write data into the respective write cache 112 (112-1 or 112-2), rather than immediately write data to the object store 104.

In response to a SQL query that reads data, the SQL engine 110 can first attempt to satisfy the read request from the respective write cache 112 as well as from the respective read cache (if present). If a miss occurs (i.e., the requested data is not in the write cache 112 or read cache), then the SQL engine 110 can retrieve the data from the object store 104.

The I/O latency associated with performing a write of data to the object store 104 can be relatively high, such as in excess of hundreds of milliseconds. The I/O latency for reading data from the object store 104 can also be relatively high, and can be in the range of hundreds of milliseconds.

By providing the write cache 112 and read cache in each database server 102, write and read performance in response to SQL queries can be improved if the data is present in a cache. A SQL query can specify a write of data of a relatively small size, when compared to the size of an object 106 of the object store 104. If the relatively small size data is written directly to the object store 104 in response to each SQL query, then write performance can suffer since writing small size data to the object store 104 is inefficient, as compared to writing data of larger sizes (e.g., in excess of 16 megabytes or other sizes) to the object store 104.

In accordance with some implementations of the present disclosure, the write cache 112 is used to collect write data (possibly for multiple SQL queries). While the write data is being collected in the write cache 112, the write data is not written to the object store 104. The collected write data in the write cache 112 can then be written as a larger piece of data (more specifically in the form of a snapshot as explained further below) to the object store 104. The object store 104 has a better performance when writing a larger amount of data to the object store 104 as compared to writing relatively small pieces of data to the object store 104.

Since the memory 114 is part of the database server 102 or is connected to the database server 102 over a relatively high-speed link, writing data to and reading data from the memory 114 can occur at a higher speed (lower I/O latency) than writing data to and reading data from the remote object store 104.

A client device 150 that submitted a query can be informed that a transaction is complete as soon as one of a database server 102 executes the query and writes the corresponding data into the write cache 112, and a unity transaction log 128 (discussed further below) is saved in persistent storage. Thus, in some examples, the only write to persistent storage that has to occur before the query is considered complete (from the perspective of the client device 150) is the write of the unity transaction log 128 to the persistent storage. I/O latency is reduced since the few unity servers (at least 2) can have directly connected persistent storage that has storage optimized for writes. The many database servers can have storage optimized for read, data size and throughput (not write latency) like most object stores.

The mechanism by which write data in the write cache 112 is written to the object store 104 is a snapshot mechanism. Each database server 102 includes a respective snapshot control engine 116 (116-1 or 116-2), which can take a snapshot of the data in the write cache 112, and write the snapshot to one or more objects 106 (either one or more existing objects 106 or one or more new objects 106) in the object store 104.

A "snapshot" can refer to a copy of data at a corresponding point-in-time. A snapshot is taken using a copy-on-write (COW) technique, in which one or more writes of write data causes a copy of modified data to be included in the snapshot. Note that the snapshot includes just modified data, and would not include un-modified data. A snapshot contains data that is different from a prior snapshot (taken at a prior point in time).

Different snapshots are taken at different times, and thus include copies of data at different points in time. The snapshot control engine 116 can wait for the write cache 112 to fill up with write data up to a specified threshold. For example, the snapshot control engine 116 can wait for the cache 112 to fill up to some percentage of the capacity of the write cache 112, such as 75%, 80%, etc. In response to detecting the cache 112 having filled up with write data (in response to one or more write operations) to the specified threshold, the snapshot control engine 116 takes a snapshot to copy the write data in the write cache 112 to one or more objects 106 of the object store 104.

The snapshot control engine 116 thus updates the object store 104 from snapshot to snapshot taken from write data in the write cache 112. The size of each snapshot written to the object store 104 can be relatively large, such as 16 megabytes (MB) or larger. Although a specific size is provided in this example, it is noted that in other examples, snapshots written to the object store 104 by the snapshot control engine 116 can have different sizes.

Although examples are described in which snapshots are used to write data of the write cache 112 to the object store 104, in other examples, any other type of backups can be employed. More generally, a database server 102 can perform a backup to copy data in the write cache 112 to the object store 104 (or any other persistent storage).

When write data of a transaction is written to a respective write cache 112 of a database server 102, the database server 102 can send an indication of completion of the transaction to a requester. From the perspective of the requester that submitted the SQL query that resulted in the transaction, the transaction is considered to be complete even though the data has not yet been written to the object store 104.

In other words, the database server 102 does not have to wait for a snapshot containing the write data of the transaction to be written from the database server 102 to the object store 104 before sending the indication of completion of the transaction to the requester.

Using techniques or mechanisms according to some implementations of the present disclosure, write data is kept in local storage (e.g., the write cache 112 in the memory 114) of the database server 102, until the corresponding snapshot is taken and written to the object store 104. If the write cache 112 is to fill up and run out of space before a snapshot can be taken, then "spillover" of a portion of the write data can be performed to the object store 104. For example, the object store 104 can include a section 130 for storing spillover write data from the write cache 112 that has filled to capacity. In situations where there has been spillover of write data from the write cache 112 to the spillover write data section 130, a snapshot taken by the snapshot control engine 116 to be written to an object 106 of the object store 104 would include write data from the write cache 112 as well as write data from the spillover write data section 130.

Each database server 102 further includes a respective persistent storage 118 (118-1 or 118-2). A "persistent storage" can be implemented using one or more disk-based storage devices, one or more nonvolatile memory devices, and so forth. Each persistent storage 118 can be used to store a respective transaction log 120 (120-1 or 120-2). The transaction log 120 (also referred to as a recovery log) can store transaction information of one or more transactions performed by the respective database server 102 with respect to data of the object store 104.

In other examples, each database server 102 can be configured without any persistent storage—each database server would include just volatile storage (e.g., the memory 114).

In the ensuing discussion, the transaction log 120 in the database server 102 is referred to as a "database server transaction log."

The transaction information of each transaction in the database server transaction log 120 can include information identifying one or more operations for accessing (reading and writing) data, where the operation(s) can include, as examples, a join operation, an aggregate operation, a merge operation, a sort operation, a delete operation, an update operation, an insert operation, and so forth. The transaction information of each transaction in the database server transaction log 120 further identifies the data structure(s) (e.g., table(s), row(s), etc.) against which the operation(s) is (are) performed.

Note that the transaction information in the database server transaction log 120 does not include data, which saves storage space.

In some implementations of the present disclosure, a snapshot that is saved to the object store 104 can also include transaction information of the transaction(s) associated with the write data included in the snapshot. The transaction information can be used to determine which transaction(s) was last successfully applied to the object store 104, for the purpose of data recovery in case of failure (discussed further below).

In the example of FIG. 1, a unity server 122 is also provided in the DBMS 101. In other examples, the unity server 122 can be outside of the DBMS 101. The unity server 122 can be implemented using one or more computer nodes. Although shown as separate from the database server nodes 102-1 and 102-2, in other examples, the unity server 122 can be part of one or more database servers.

The unity server 122 includes a snapshot-based recovery engine 124 to perform recovery of data in case of failure associated with a database server 102. A failure associated with a database server 102 can include any one or more of the following: a failure of hardware or software of the database server 102, a fault or error associated with writing/reading data that causes loss or corruption of data, a failure in a communication between the database server 102 and the object store 104, a failure of the object store 104, or any other failure that prevents the database server 102 from successfully completing a transaction or that causes loss or corruption of data.

The unity server 122 can also include a workload management engine 125 that is able to balance the workloads of the multiple database servers 102-1 and 102-2. The workload management engine 125 can route query workloads between the multiple database servers 102-1 and 102-2.

The unity server 122 can also perform other tasks in further examples, such as performing monitoring of the performance of the database servers 102-1 and 102-2, performing data synchronization in which data loads can be directed to more than one database server 102, with the data synchronizer keeping track of the completion status of each of the data loads, and so forth.

The unity server 122 includes a persistent storage 126 to store a transaction log 128 (also referred to as a recovery log). The transaction log 128 in the unity server 122 is referred to as a "unity transaction log" in the ensuing discussion. The unity transaction log 128 contains information of one or more transactions to be performed with respect to the object store 104 by the database server 102-1 or 102-2. The unity transaction log 128 is outside any of the database servers 102-1 to 102-2. The unity transaction log 128 can include transaction SQL information or change data capture information containing sufficient information to replay a transaction on any of the database servers 102-1 to 102-2.

In some examples, the unity transaction log 128 can store transaction information of transactions to be performed by the multiple database servers 102-1 and 102-2. In other examples, there can be multiple unity transaction logs 128 for the respective different database servers 102-1 and 102-2.

The snapshot-based recovery engine 124 of the unity server 122 can perform recovery using the information in the transaction log 128 in response to the corresponding database server 102 being placed in a "restore state," which is a state of the database server 102 that indicates the database server 102 is recovering from a failure associated with the database server 102. A database server 102 is placed in the restore state in response to either of the following conditions: the failure associated with the database server 102 has been resolved and the database server 102 can proceed with normal operations, or a failed database server 102 has been replaced with a new database server 102 (in which case the new database server 102 is placed in the restore state).

When the database server 102 is in the restore state, the database server 102 does not accept any new reads or writes to a database, table, or other data structure that is undergoing recovery.

Each given transaction referred to in the transaction log 128 remains in the transaction log 128 until a corresponding snapshot that contains the write data for the given transaction has been successfully written by the corresponding database server 102 to the object store 104. In other words, information of the given transaction cannot be removed from the transaction log 128 until the writing of the corresponding snapshot to the object store 104 has completed. Once the unity server 122 detects that the writing of the corresponding snapshot to the object store 104 has completed, then the transaction information of the respective transaction(s) associated with the write data of the snapshot can be removed from the transaction log 128 (e.g., such as by deleting the transaction information or marking the transaction information as no longer valid).

In response to a failure associated with a given database server 102 (102-1 or 102-2), the snapshot-based recovery engine 124 is able to recover from the last successful snapshot taken to the object store 104. In other words, the snapshot-based recovery engine 124 uses the last successful snapshot taken by the given database server 102 as a starting point for the recovery.

Once the given database server 102 has been restored or has been replaced with a new database server 102, the snapshot-based recovery engine 124 can cooperate with the respective snapshot control engine 116 to restore transaction information of the last snapshot from the given database server 102 to the object store 104. The restored transaction information allows the given database server 102 to determine the last transaction successfully applied by given database server 102 to the object store 104.

The snapshot-based recovery engine 124 is then able recover transaction(s) subsequent to the last transaction that was successfully applied by given database server 102 to the object store 104. The snapshot-based recovery engine 124 identifies, based on comparing the transaction information in the unity transaction log 128 with the transaction information of the last transaction successfully applied, which transaction(s) has (have) not been applied yet by the given database server 102 since the last transaction that was successfully applied.

The snapshot-based recovery engine 124 replays the identified transaction(s) from log entries of the unity transaction log 128, to catch up the restored/new database server 102 to a current state at the time that the failure.

While recovery is being performed for the given database server 102, the other database server 102 of the DBMS 101 can continue to accept transactions.

Note that the database server 102 taking a snapshot and the unity server 122 do not have to be paused when the snapshot is being taken. In other words, while the database server 102 is taking the snapshot and writing data of the snapshot to the object store 104, other operations of the database server 102 and the unity server 122 can continue. In some cases, the unity transaction log 128 may not reflect the fact that a snapshot has completed, and the corresponding transaction is considered completed at the database server 102. When a given transaction is completed at the database server 102 (i.e., the snapshot has been copied to the object store 104), the database server transaction log 120 will indicate the given transaction as complete. The unity server 122 will ask the database server 102 what transaction has already completed, and skip replaying any transaction that has been completed. In fact, if a failure were to occur during a replay of transactions from the unity transaction log 128, the replay can just restart and the transactions already replayed can be skipped.

Figure 2A:
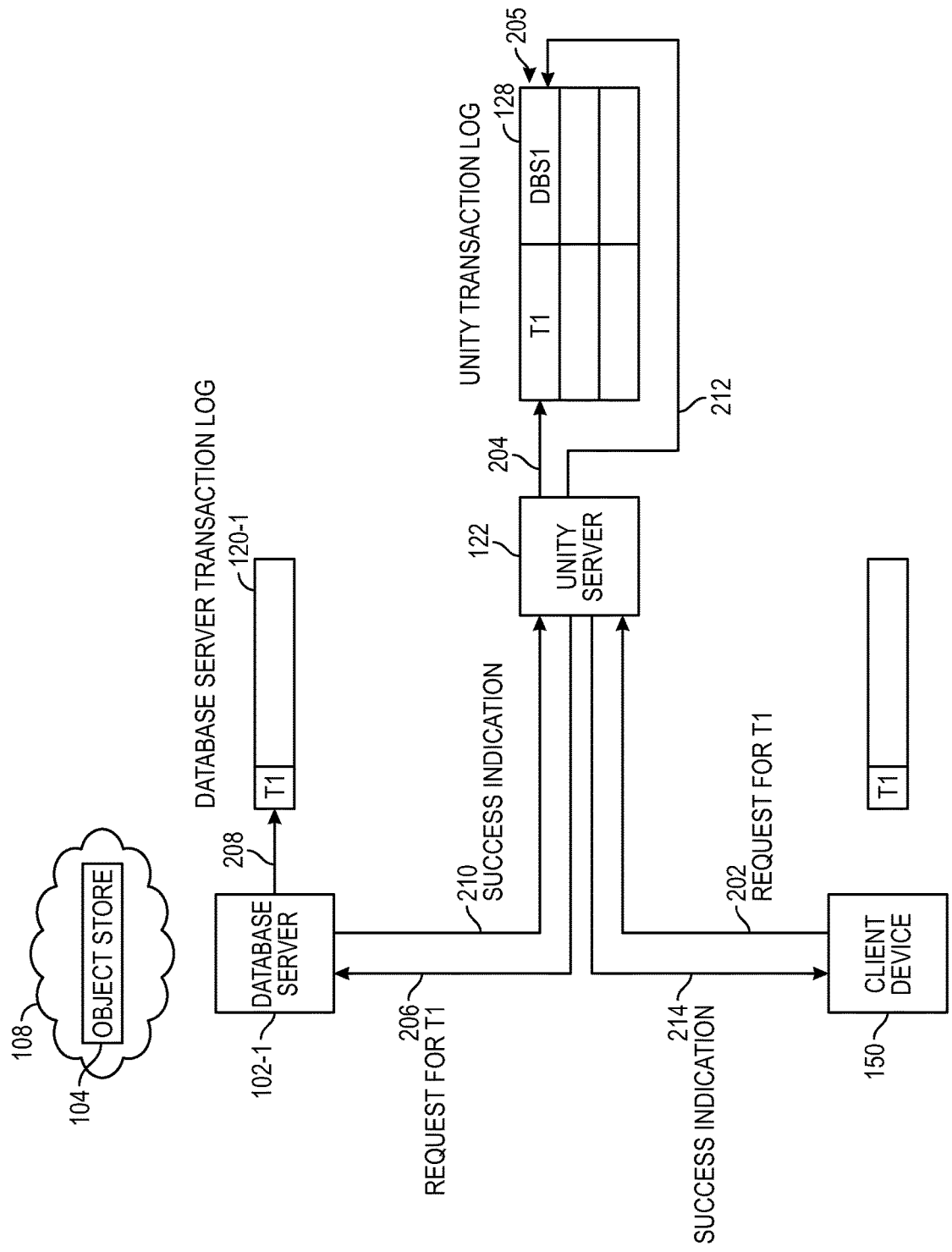

FIGS. 2A-2D illustrate an example of performing a snapshot-based recovery. In FIG. 2A, a client device 150 submits a request (e.g., in the form of a SQL query, a load request, etc.) for transaction T1 (at 202) to the unity server 122. In response to the request, the unity server 122 adds (at 204) transaction information for transaction T1 to a log entry 205 of the unity transaction log 128. The log entry 205 is for transaction T1.

The unity server 122 forwards (at 206) the request for transaction T1 to the database server 102-1. In some examples, the workload management engine 125 (FIG. 1) of the unity server 122 can select one of multiple database servers to which transaction T1 is to be directed. In the example of FIG. 1, it is assumed that the workload management engine 125 has selected the database server 102-1 for transaction T1.

In response to receipt of the request for transaction T1 from the unity server 122, the database server 102-1 adds (at 208) the transaction information of transaction T1 to a log entry of the database server transaction log 120-1. The database server 102-1 also performs transaction T1 and stores write data in the write cache 112-1 of the database server 102-1.

After the transaction information of transaction T1 has been added to the database server transaction log 120-1, and transaction T1 has been performed by the database server 102-1 (with write data for transaction T1 stored in the write cache 112-1), the database server 102-1 responds (at 210) with a success indication to the unity server 122. In response to the success indication from the database server 102-1, the unity server 122 adds (at 212) an indicator (e.g., an identifier or other information) of the database server 102-1 (e.g., DBS1 in the example of FIG. 2A) to the log entry 205 of unity transaction log 128 for transaction T1. The indicator DBS1 indicates that the database server 102-1 has responded with a success indication for transaction T1. The indicator DBS1 added to the log entry 205 of the unity transaction log 128 is to allow the unity server 122 to later determine that transaction T1 was sent to the database server 102-1, in case a recovery procedure is to be performed.

At this point, the unity server 122 can send (at 214) a success indication to the client device 150 indicating that the transaction T1 has successfully completed, even though the write data of transaction T1 has not yet been written to the object store 104.

Figure 2B:
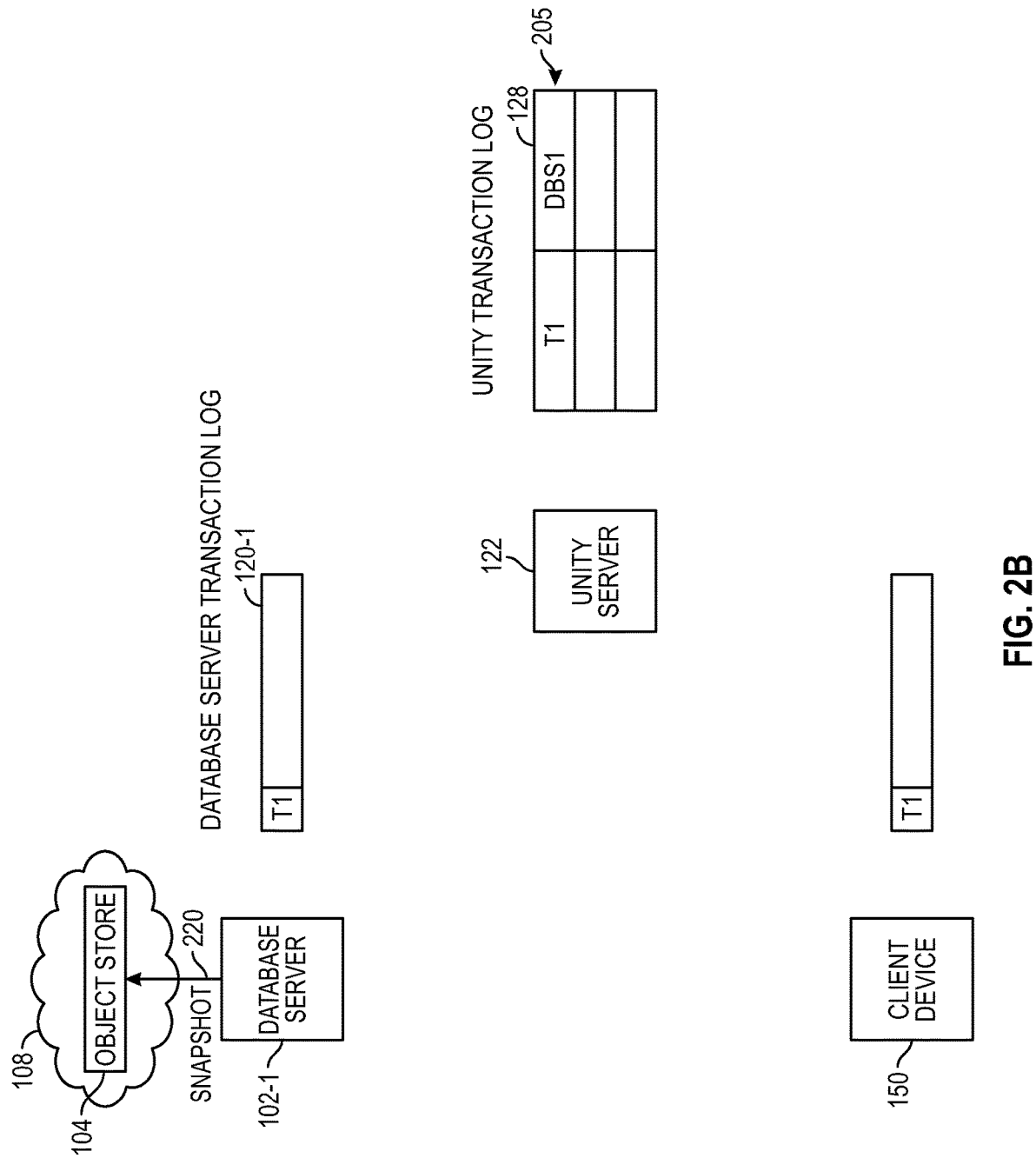

FIG. 2B shows an example where the snapshot control engine 116-1 (FIG. 1) of the database server 102-1 has determined that a snapshot is to be taken to copy the write data in the write cache 112-1 for transaction T1 (and possibly other transactions) to the object store 104. The trigger for taking the snapshot can be in response to the filling the write cache 112-1 to a specified threshold.

The snapshot control engine 116-1 writes the snapshot (at 220) to the object store 104. It is noted that the snapshot can be written as one or more objects 106 into the object store 104.

While the one or more objects corresponding to the snapshot are being written to the object store 104, the data segments corresponding to the snapshot are locked. A "data segment" can refer to any identifiable portion of a storage to store data. For example, if the storage of the object store 104 includes a disk-based storage, then data segments can include cylinders of the disk-based storage. Any writes to the locked data segments would result in the write data being copied to a new location until the data segments of the snapshot have been successfully written to the object store 104 and unlocked.

FIG. 2C further shows that the client device 150 has submitted (at 222) a request for transaction T2 to the unity server 122. In response, the unity server 122 adds (at 224) transaction information for transaction T2 to a log entry 225 of the unity transaction log 128. The log entry 225 is for transaction T2.

The unity server 122 forwards (at 226) the request for transaction T2 to the database server 102-1 (assuming that the workload management engine 125 of the unity server 122 has selected the database server 102-1 to process transaction T2). In response to the request for transaction T2, the database server 102-1 adds (at 228) transaction information of transaction T2 to a log entry 228 of the database server transaction log 120-1.

After adding the transaction information of transaction T2 to the log entry 228 of the database server transaction log 120-1, and after performing transaction T2 in which write data of transaction T2 is stored in the write cache 112-1 (FIG. 1) of the database server 102-1, the database server 102-1 responds (at 230) with a success indication to indicate that transaction T2 has successfully completed, even though the write data of transaction T2 has not yet been written to the object store 104.

In response to the success indication, the unity server 122 adds (at 232) an indicator (e.g., DBS1 in the example of FIG. 2C) to the log entry 225 of unity transaction log 128 for transaction T2. At this point, the unity server 122 sends (at 234) a success indication to the client device 150, to indicate completion of transaction T2.

Figure 2D:
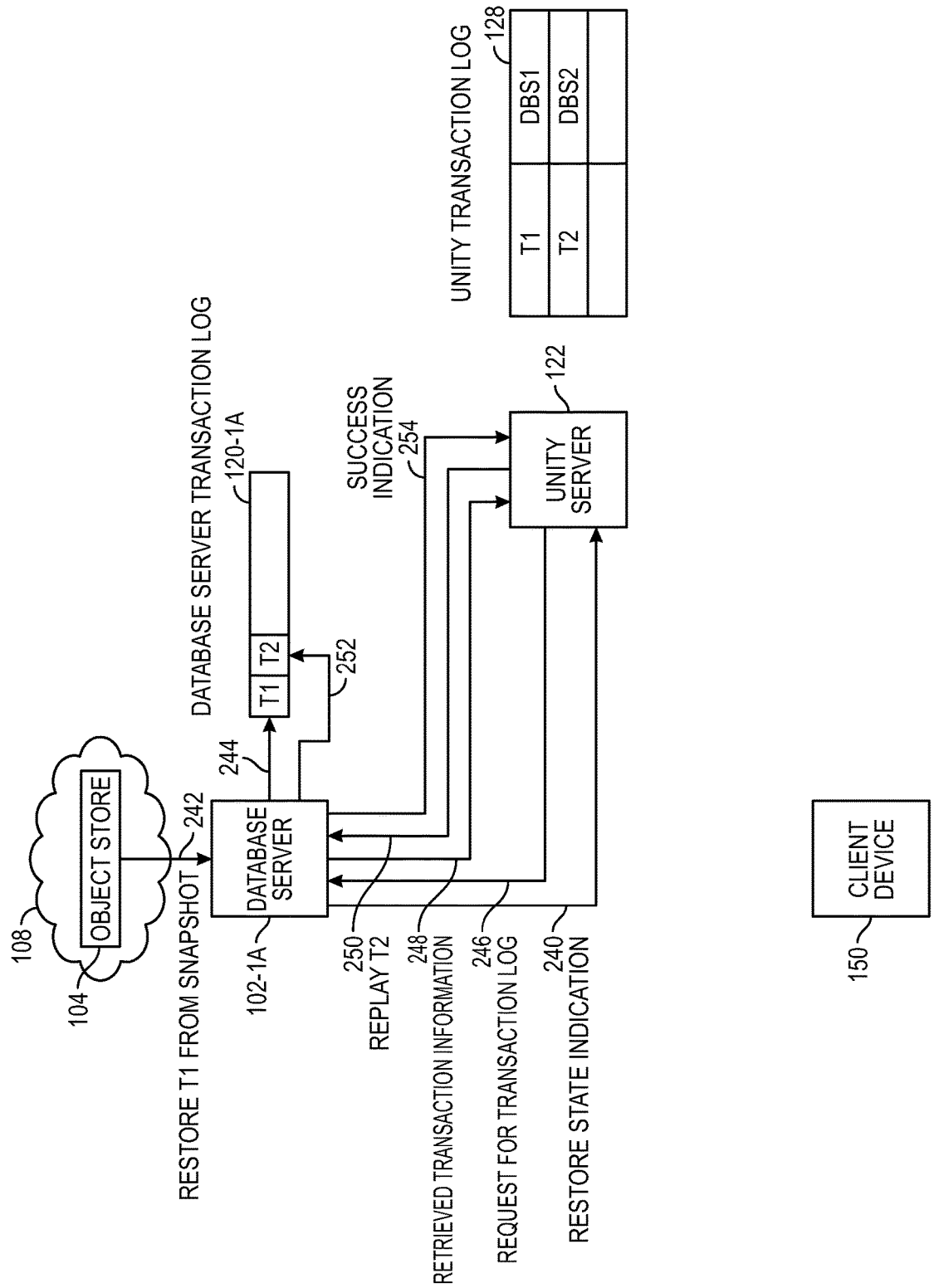

FIG. 2D shows an example where the database server 102-1 has experienced a failure. In FIG. 2D, a database server 102-1A represents either the original database server 102-1 after repairs, or a replacement database server to replace the failed database server 102-1.

Note that at the time of the failure of the database server 102-1, a snapshot containing write data for transaction T2 has not yet been written to the object store 104. Thus, the failure of the database server 102-1 has caused the log entries that were in the database server transaction log 120-1 for transactions T1 and T2 to be lost. As a result, the write data for transaction T2 is unavailable in the object store 104, even though the client device received a success indication (at 228 in FIG. 2C) that transaction T2 has successfully completed.

However, a snapshot of the write data for transaction T1 was written to the object store 104 (220 in FIG. 2B). This snapshot can be used to recover the write data for transaction T1.

The unity server 122 receives (at 240) an indication that the database server 102-1 has failed and the database server 102-1A is attempting to recover from the failure. The indication received (at 240) can be referred to as a "restore state indication" in examples where the database server 102-1A can be set to a restore state for recovering from a failure. The restore state indication can be in the form of a message or any other information element.

In the restore state, the snapshot control engine 116-1 (FIG. 1) of the database server 102-1A can restore (at 242), from the object store 104, the last snapshot that was written to the object store 104 from the failed database server 102-1. The restored snapshot contains transaction information for transaction T1. The database server 102-1A can add (at 244) the transaction information for transaction T1 to a log entry of the database server transaction log 120-1A for the database server 102-1A. At this point, the database server transaction log 120-1A contains a log entry for transaction T1 but not for transaction T2.

In response to the restore state indication (received at 240), the snapshot-based recovery engine 124 (FIG. 1) of the unity server 122 sends (at 246), to the database server 102-1A, a request for content of the database server transaction log 120-1A. In response, the database server 102-1A sends (at 248) transaction information retrieved from the database server transaction log 120-1A to the unity server 122.

The snapshot-based recovery engine 124 in the unity server 122 compares the retrieved transaction information from the database server transaction log 120-1A with the transaction information in the unity transaction log 128 to determine what transactions are missing from the database server transaction log 120-1A of the database server 102-1A.

Based on the comparing, the snapshot-based recovery engine 124 identifies transaction T2 is missing from the database server transaction log 120-1A. As a result, the snapshot-based recovery engine 124 replays (at 250) transaction T2 to the database server 102-1A. Replaying transaction T2 can refer to resubmitting a request (including one or more SQL queries, loads, etc.) for transaction T2 to the database server 102-1A.

The replaying of transaction T2 causes the database server 102-1A to add (at 252) transaction information of transaction T2 to a log entry of the database server transaction log 120-1A. The database server 102-1A further performs transaction T2, which causes write data of transaction T2 to be written to the write cache 112-1 of the database server 102-1A. At this point, the database server 102-1A has caught up to the transactions existing at the failed database server 102-1 at the time of the failure.

The database server 102-1A can provide a success indication (at 254) to the unity server 122, to indicate that the replayed transaction T2 has successfully been performed at the database server 102-1A.

Subsequently, when a trigger condition occurs (e.g., the write cache 112-1 in the database server 102-1A has filled to a specified threshold), the database server 102-1A can take a snapshot to copy the write data of transaction T2 (and possibly other transactions) to one or more objects of the object store 104.

Figure 3:
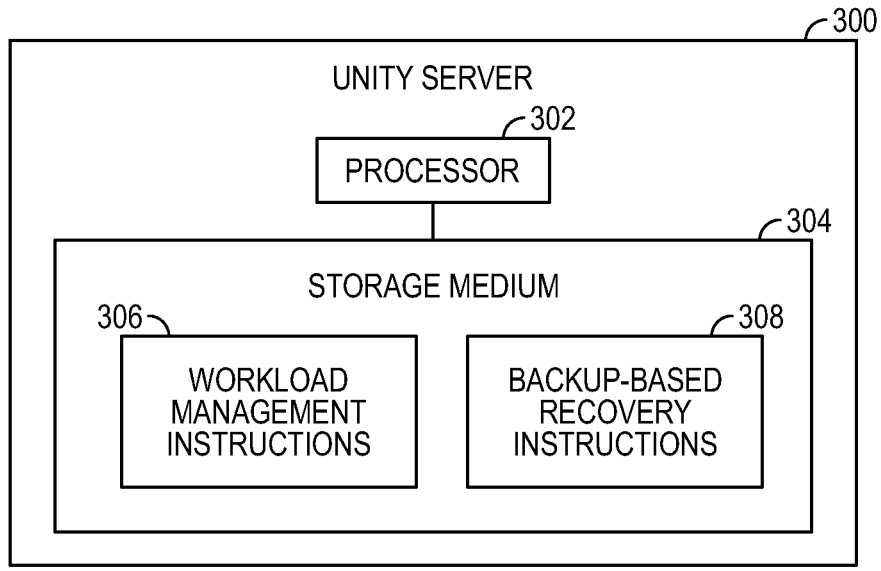
FIG. 3 is a block diagram of an example unity server according to some implementations of the present disclosure.

FIG. 3 is a block diagram of an example unity server 300 (similar to the unity server 122 of FIG. 1, for example). The unity server 300 includes one or more hardware processors 302. A hardware processor can include a microprocessor, a core of a multi-core microprocessor, a microcontroller, a programmable integrated circuit, a programmable gate array, a digital signal processor, or another hardware processing circuit.

The unity server 300 further includes a non-transitory machine-readable or computer-readable storage medium 304 storing workload management instructions 306 and backup-based recovery instructions 308 that are executable on the one or more hardware processors 302.

The workload management instructions 306 can perform tasks similar to those of the workload management engine 125 of FIG. 1, for example. The backup-based recovery instructions 308 can perform tasks similar to those of the snapshot-based recovery engine 124 of FIG. 1, for example, except that the backup-based recovery instructions 308 can employ any type of backups of write data in a write cache to the object store 104.

The workload management instructions 306 can receive a transaction from a client device, and send the transaction to a first database server (e.g., 102-1 or 102-2 of FIG. 1) to cause storing of data of the transaction in a cache (e.g., 112-1 or 112-2 of FIG. 1) of the first database server. The data in the cache can be included in a backup of data written from the first database server to a remote data store (e.g., 104 in FIG. 1). Receiving a transaction can refer to receiving a request for the transaction (e.g., a SQL query, a load request, etc.), and sending a transaction can refer to sending a request for the transaction.

The backup-based recovery instructions 308 detect a failure associated with the first database server. For example, the detection of the failure can be based on receiving a restore state indication (e.g., 240 in FIG. 2D) from the first database server (or a replacement database server that replaces the first database server) indicating that the database server is restoring from a failure.

In response to detecting the failure, the backup-based recovery instructions 308 request, from the first database server or the replacement database server, transaction information of at least one transaction that was successfully applied to the remote data store (based on taking a backup of write data in the cache and writing the backup to the remote data store). The transaction information can be recovered by restoring the backup of write data from the remote data store, and storing the recovered transaction information into a database server transaction log of the first database server or the replacement database server.

The backup-based recovery instructions 308 then cause replay one or more transactions to recover data at the first database server or the replacement database server, to perform recovery of the first database server or the replacement database server to a current state prior to a time of the failure. The replayed one or more transactions can be subsequent to the at least one transaction that was successfully applied to the remote data store, and the replayed one or more transactions was not applied to the remote data store at the time of the failure.

In some examples, while the recovery of the first database server or the replacement database server is progressing, workload management instructions 306 can direct a second transaction to a second database server to cause storing of data of the second transaction in a cache of the second database server, where the data in the cache of the second database server is included in a second backup of data written from the second database server to the remote data store.

Figure 4:
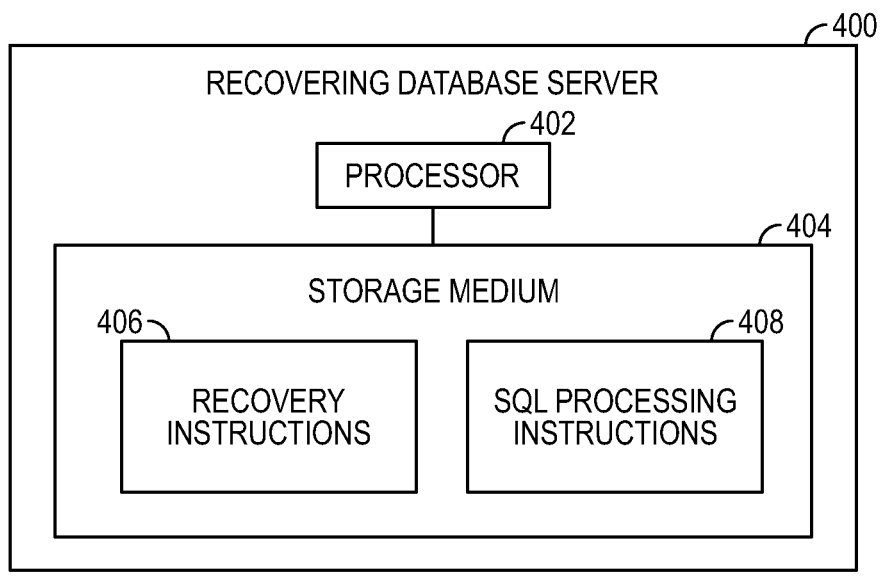
FIG. 4 is a block diagram of an example unity database server according to some implementations of the present disclosure.

FIG. 4 is a block diagram of an example recovering database server 400. The recovering database server 400 is a database server that previously experienced a failure and is attempting to restore from the failure, or the recovering database server 400 is a replacement database server that replaces the database server that previously experienced the failure.

The recovering database server 400 includes one or more hardware processors 402, and a non-transitory machine-readable or computer-readable storage medium 404 storing recovery instructions 406 and SQL processing instructions 408 that are executable on the one or more hardware processors 402.

As part of a restore process to recover from the failure, the recovery instructions 406 restore transaction information from a data backup written to a remote data store (e.g., 104 in FIG. 1), where the data backup contains data in a write cache of the database server that experienced the failure. The recovery instructions 406 send the restored transaction information to a recovery server (e.g., the unity server 122 of FIG. 1).

The SQL processing instructions 408 receive, from the recovery server, a first transaction to be replayed, where write data of the first transaction has not been applied to the remote data store in a data backup.

The SQL processing instructions 408 replay the first transaction to recover the recovering database server 400 to a current state prior to the failure.

Figure 5:
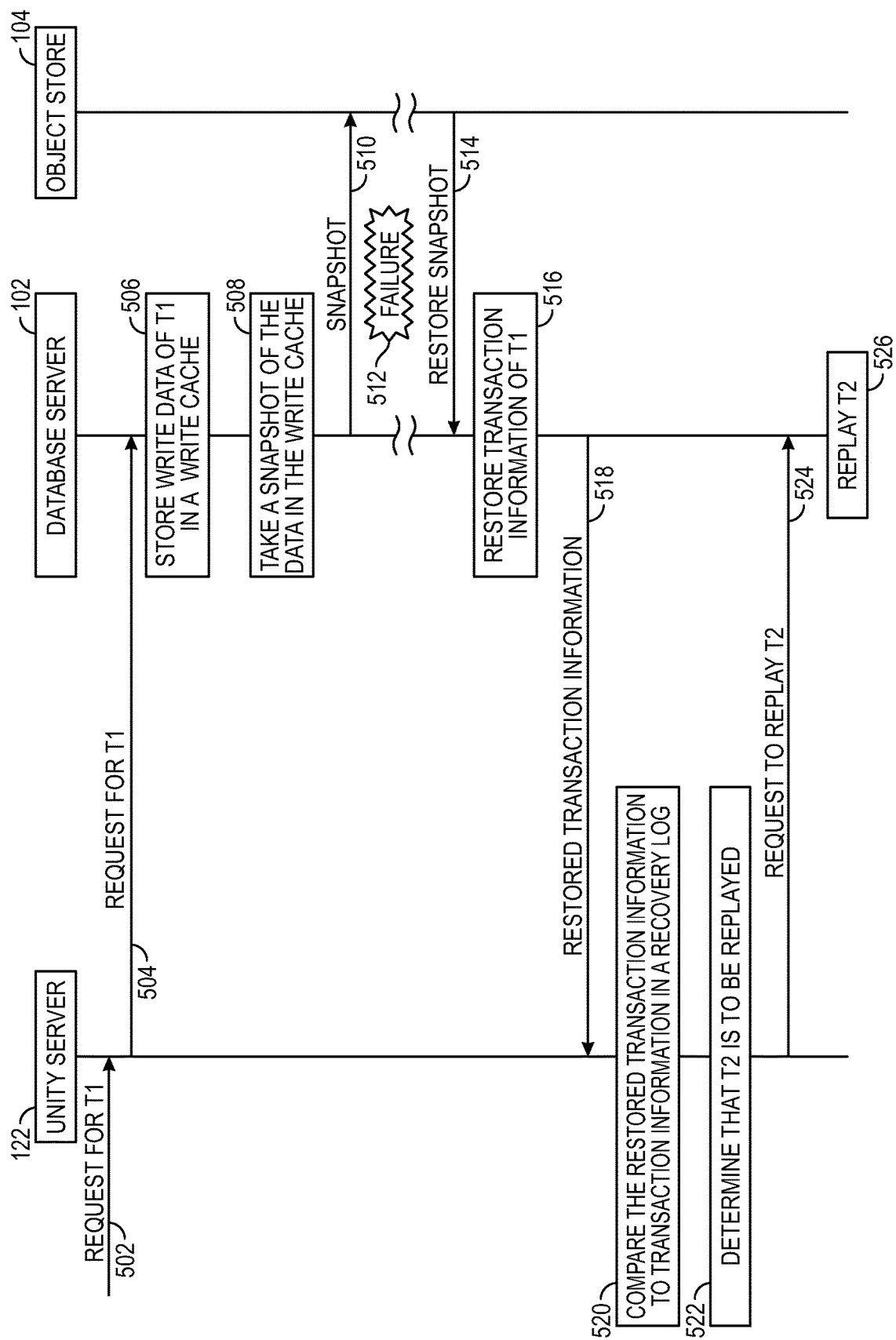
FIG. 5 is a flow diagram of an example process according to some implementations of the present disclosure.

FIG. 5 is a flow diagram of an example process according to some implementations of the present disclosure. The process of FIG. 5 can be performed by the unity server 122 and a database server 102.

The unity server 122 receives (at 502) a request for transaction T1, such as from a client device 150 (FIG. 1). The unity server 122 sends (at 504) the request for transaction T1 to the database server 102.

The database server 102 stores (at 506) write data of the transaction T1 in a write cache of the database server 102.

In response to a trigger condition (e.g., the write cache filling up to a specified threshold), the database server 102 takes (at 508) a snapshot of the write data in the write cache, and sends (at 510) the snapshot of the write data to the remote object store 104.

As part of a recovery process from a failure 512, the database server 102 performs the following tasks. The database server 102 restores (at 514) the snapshot from the remote object store 104. The database server 102 restores (at 516) transaction information of the transaction T1 based on the restored snapshot. The database server 102 sends (at 518) the restored transaction information to the unity server 122.

The unity server 122 compares (at 520) the restored transaction information with transaction information in a recovery log (e.g., 128 in FIG. 1) of the unity server 122. It is assumed that the recovery log includes transaction information of transaction T1 and transaction T2, where the write data of transaction T2 was not successfully applied by the database server 102 to the remote data store 104 in a snapshot prior to the failure 154.

Based on the comparing, the unity server 122 determines (at 522) that the transaction T2 is to be replayed at the database server 102. The unity server 122 sends (at 524), to the database server 102, the request to replay transaction T2.

The database server 102 replays transaction T2.

Although FIG. 5 refers to snapshots, it is noted that in other examples, other types of data backups can be employed.

A storage medium (e.g., 304 or 404) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A system comprising:
   a processor; and
   a non-transitory storage medium storing instructions executable on the processor to:
   send a transaction to a database server to cause storing of data of the transaction in a cache of the database server, wherein the data in the cache is for inclusion in a backup of data from the database server to a remote data store,
   detect a failure associated with the database server, in response to detecting the failure:
   request, from the database server or a replacement database server, transaction information of at least one transaction that was successfully applied to the remote data store, the transaction information based on the backup of data, wherein the remote data store is accessible by the database server and the replacement database server, and
   cause replay of one or more transactions to recover data at the database server or the replacement database server to perform recovery of the database server or the replacement database server to a current state.

2. The system of claim 1, wherein the transaction information requested from the database server or the replacement database server is from a transaction log at the database server or the replacement database server.

3. The system of claim 2, wherein the transaction information of the at least one transaction in the transaction log is restored from the backup of data recovered from the remote data store.

4. The system of claim 1, wherein the replayed one or more transactions are subsequent to the at least one transaction, and have not yet been applied to the remote data store at a time of the failure.

5. The system of claim 1, wherein the remote data store is an object store coupled over a network to the database server.

6. The system of claim 1, wherein the database server is a first database server, and wherein the instructions are executable on the processor to:
   while the first database server is in failure or recovery, performing a workload at one or more other database servers, and recording transaction information of the workload in a transaction log for use in recovery of the first database server to a current state.

7. The system of claim 1, wherein the instructions are executable on the processor to:
   receive a request for the transaction from a client device, and
   responsive to an indication that the data of the transaction has been stored in the cache of the database server, send, to the client device, an indication that the transaction has been completed.

8. The system of claim 7, wherein the sending of the indication that the transaction has been completed occurs prior to the backup of data being written from the database server to the remote data store.

9. The system of claim 1, wherein the instructions are executable on the processor to:
   store, in a transaction log, transaction information of transactions that have been sent to the database server, wherein causing the replaying of the one or more transactions is based on one or more entries of the transaction log.

10. The system of claim 9, wherein the instructions are executable on the processor to:
    compare the transaction information in the transaction log with the transaction information of the at least one transaction that was successfully applied to the remote data store, and
    identify the one or more transactions to be replayed based on the comparing.

11. A non-transitory machine-readable storage medium comprising instructions that upon execution cause a first database server to:
    as part of a restore process to recover from a failure:
    send, to a recovery server, an indication that the first database server is performing the restore process;
    restore transaction information from a data backup written to a remote data store, wherein the data backup contains data in a write cache of the first database server or a write cache of a second database server that the first database server replaces;
    receive, from the recovery server, a request for transaction information in a transaction log of the first database server;
    send the restored transaction information to the recovery server, wherein the remote data store is accessible by the first database server and the recovery server, wherein the sending of the restored transaction information to the recovery server is responsive to the request;
    receive, from the recovery server, a first transaction to be replayed, wherein write data of the first transaction has not been applied to the remote data store in a data backup; and
    cause replay of the first transaction to recover the first database server to a current state.

12. The non-transitory machine-readable storage medium of claim 11, wherein the instructions upon execution cause the first database server to:

store data of the replayed first transaction in the write cache, without writing the data of the replayed first transaction to the remote data store unless a trigger condition is satisfied.

13. The non-transitory machine-readable storage medium of claim 12, wherein the instructions upon execution cause the first database server to:
in response to the trigger condition, take a data backup of the write data in the write cache, and
write the data backup to the remote data store.

14. The non-transitory machine-readable storage medium of claim 13, wherein the instructions upon execution cause the first database server to:
determine that the trigger condition is satisfied based on the write cache filling to a specified threshold.

15. The non-transitory machine-readable storage medium of claim 11, wherein the receiving of the first transaction to be replayed comprises receiving one or more of a Structured Query Language (SQL) query and a data load request.

16. A method comprising:
receiving, by a first server, a request for a first transaction;
sending, by the first server, the request for the first transaction to a database server;
storing, by the database server, write data of the first transaction in a cache of the database server;
in response to a trigger condition, taking a backup of the write data in the cache, and
sending, by the database server, the backup of the write data to a remote object store; and
as part of a recovery process from a failure, the database server:
restoring the backup from the remote object store, restoring transaction information of the first transaction based on the restored backup,
sending the restored transaction information to the first server,
receiving, from the first server, a request to replay a second transaction for which a backup was not written to the remote object store, and
replaying the second transaction to recover data at the database server to a state at a time of the failure or a current state of the second transaction.

17. The method of claim 16, further comprising:
storing, by the first server, transaction information of the first transaction and the second transaction in a recovery log;
comparing, by the first server, the restored transaction information with the transaction information in the recovery log;
based on the comparing, determining, by the first server, that the second transaction is to be replayed at the database server; and
sending, by the first server to the database server, the request to replay the second transaction.

18. The method of claim 16, further comprising:
storing, by the database server, write data of the second transaction in the cache of the database server, as part of replaying the second transaction; and
in response to the trigger condition, taking a further backup of the write data of the second transaction in the cache, and sending, by the database server, the further backup of the write data of the second transaction to the remote object store.

* * * * *